Oct. 17, 1967 S. JURA 3,347,435

BRAKE OR DRIVE UNIT FOR RECORDING TAPE

Filed Aug. 18, 1965 4 Sheets-Sheet 1

INVENTOR.
Stanislav Jura
BY
Richard Low
Ag't

INVENTOR.
Stanislav Jura
BY Richard Low
Ag't

Oct. 17, 1967 S. JURA 3,347,435
BRAKE OR DRIVE UNIT FOR RECORDING TAPE
Filed Aug. 18, 1965 4 Sheets-Sheet 3

INVENTOR.
Stanislav Jura
BY Richard Low
Ag't

Oct. 17, 1967 S. JURA 3,347,435

BRAKE OR DRIVE UNIT FOR RECORDING TAPE

Filed Aug. 18, 1965

4 Sheets-Sheet 4

INVENTOR.

Stanislav Jura

BY

United States Patent Office 3,347,435

Patented Oct. 17, 1967

3,347,435
BRAKE OR DRIVE UNIT FOR RECORDING TAPE

Stanislav Jura, Prague, Czechoslovakia, assignor to Výzkumný ústav matematických strojů, Prague, Czechoslovakia Filed Aug. 18, 1965, Ser. No. 480,744
21 Claims. (Cl. 226—176)

ABSTRACT OF THE DISCLOSURE

A drive or brake unit for recording tape in which the tape is guided through a gap between the friction facing of a brake member or of a drive wheel and the armature of an electromagnet. The armature is withdrawn by a magnet from the friction facing against an abutment set to provide a maximum clearance between the armature and the friction facing which is only fractionally greater than the tape thickness. The armature is moved toward the friction facing to brake or accelerate the tape by a spring or an electromagnet.

This invention relates to tape transport or conveying mechanisms, and particularly to a mechanism for quickly accelerating a recording tape in a computer or similar device to full conveying speed, and for equally quickly arresting the tape movement.

Tapes are commonly employed as carriers of information in computers and similar devices which require that the tape be stopped during recording of information or during read-out. Punched tapes are typical of the information carriers with the conveying of which this invention is concerned, but it will be understood that the invention is not limited to specific types of tapes, and the term "tape" will be understood to include elongated, practically endless information carriers of any uniform cross section.

An object of the invention is the provision of a device which permits tape to be accelerated to a longitudinal velocity of the order of at least 5 meters per second within a period of the order of ten to one hundred microseconds, and to arrest the tape movement within a similar period without damage to the tape.

Another object is the provision of a tape conveying apparatus which causes only minimum wear of the tape, and avoids heating of the tape by friction.

These objects are achieved by the instant invention which employs a release magnet for normally holding an armature member away from the tape with a force sufficient to balance the forces of gravity and the like which would otherwise drive the armature member toward the tape and thereby cause frictional engagement of the tape with either a brake or a drive roll, and which limits the movement of the armature member away from the tape by an abutment to a distance which is much smaller than the tape thickness, and preferably not more than 0.02 mm. for a typical tape having a thickness of 0.1 millimeter.

The exact nature of this invention as well as other objects and advantages thereof will be readily apparent from consideration of the following specification relating to the annexed drawing in which.

Figure 1:
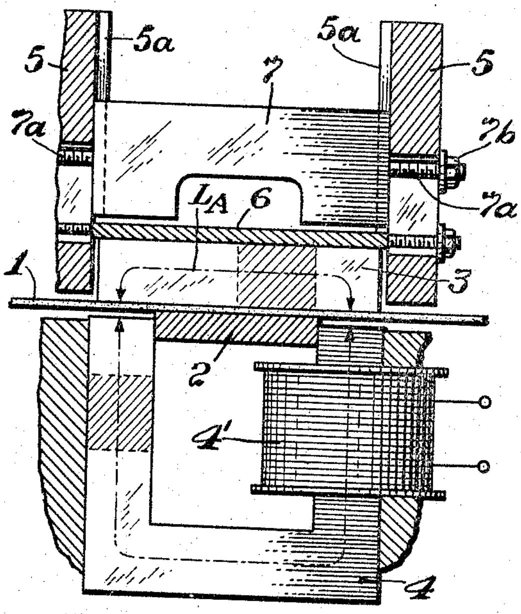
FIG. 1 shows the brake unit of a tape conveying mechanism of the invention in elevation, and partly in section.

Referring now to the drawing in detail, and initially to FIG. 1, there is seen a tape 1 which is guided over the exposed brake face of a friction member 2 by a drive unit, not itself seen in FIG. 1. The tape 1 is located in a gap between the friction member 2 and a longitudinal face of a prismatic rectangular armature member 3.

The armature member 3 closes the magnetic circuit of an electromagnet whose core 4 is approximately U-shaped, and which is energized by electric current flowing through a coil 4' which envelops one leg of the core 4. The friction member 2 is fastened between the poles of the core 4 and slightly projects into the gap so as to prevent contact between the tape 1 and the core.

The armature member 3 is normally held against a non-ferrous metal bar 6 by a permanent release magnet 7 arranged above the bar 6. The elements of the brake mechanism described so far are mounted on a non-ferrous supporting frame 5. Terminal portions of the magnet 7 are received in vertical guide grooves 5*a* of the frame to permit adjusting movement of the release magnet toward and away from the brake face of the friction member 2. The magnet may be secured in a selected position by threaded pins 7*a* extending from the magnet through slots in the frame 5 and carrying nuts 7*b*. The bar 6 may be correspondingly adjusted and fixed in the adjusted position.

The magnet 7 and bar 6 are positioned on the frame 5 in such a manner that the gap between the opposite faces of the armature member 3 and of the friction member 2 is only slightly wider than the thickness of the tape 1, and the gap is so narrow as not to be capable of pictorial representation on the scale of FIG. 1. The magnetic force of the magnet 7 is adjusted by movement of the magnet in the groove 5*a* so that it approximately balances the weight of the armature member, and the bar member 6 functions as an abutment which limits lifting movement of the armature member 3 to a gap width which is preferably less than 0.02 mm. for a tape thickness of 0.1 mm. Yet, the tape may pass freely through the gap as long as the coil 4' is not magnetized.

The friction member 2 preferably consists of a non-magnetic cermet material whose metallic phase consists of bronze or the like. The magnetic circuit of the electromagnet 4, 4' which provides braking pressure thus is closed through the armature member 3 only, and the reluctance of the narrow gap is very low even when the tape 1 consists of non-magnetic material, for example, plastic. The reluctance of the gap is further reduced if the tape employed is magnetic whereby the gap in the magnetic circuit is practically eliminated. It will be appreciated that the rate at which the armature member 3 is attracted toward the brake face of the friction member 2 is inversely related to the reluctance of the gap, and that the rate of deceleration of the tape by the illustrated brake assembly is directly related to the rate of attraction of the armature member 3 by the magnet 4, 4'.

Optimal conditions of armature attraction are obtained when the dimensions of the brake unit satisfy the equation $$Q_A = \frac{p_K \cdot L_A \cdot Q_K}{2p_A \cdot p_K \cdot x + p_A \cdot L_K}$$

wherein subscripts A and K respectively refer to the armature member 3 and to the magnet core 4, Q is cross sectional area transverse of the magnetic flux, $p$ is relative permeability, L is length of the median line of magnetic force or flux, and $x$ is the thickness of a non-magnetic tape, or the width of the gap.

When $x$ is negligibly small as compared to $L_K$, the formula may be simplified to read $$Q'=\frac{p_K \cdot L_A \cdot Q_K}{p_A \cdot L_K}$$

The second formula is quite accurate when ferromagnetic tape is being employed, and provides otherwise good first order approximations.

The permanent magnet 7 normally holds the armature member 3 in its inoperative position in abutment against the bar 6, and the armature member 3 is attracted toward the friction member 2 when the coil 4' is energized, thereby clamping the tape 1 between the opposite faces of the elements 2 and 3, and arresting its movement.

If the use of spliced tape is contemplated, the bar 6 may be made partly or entirely of rubber of a rigidity selected to limit movement of the armature 3 against the force of the release magnet 7, but to yield when the wedging action of a tape splice assists the magnetic force.

Figure 2:
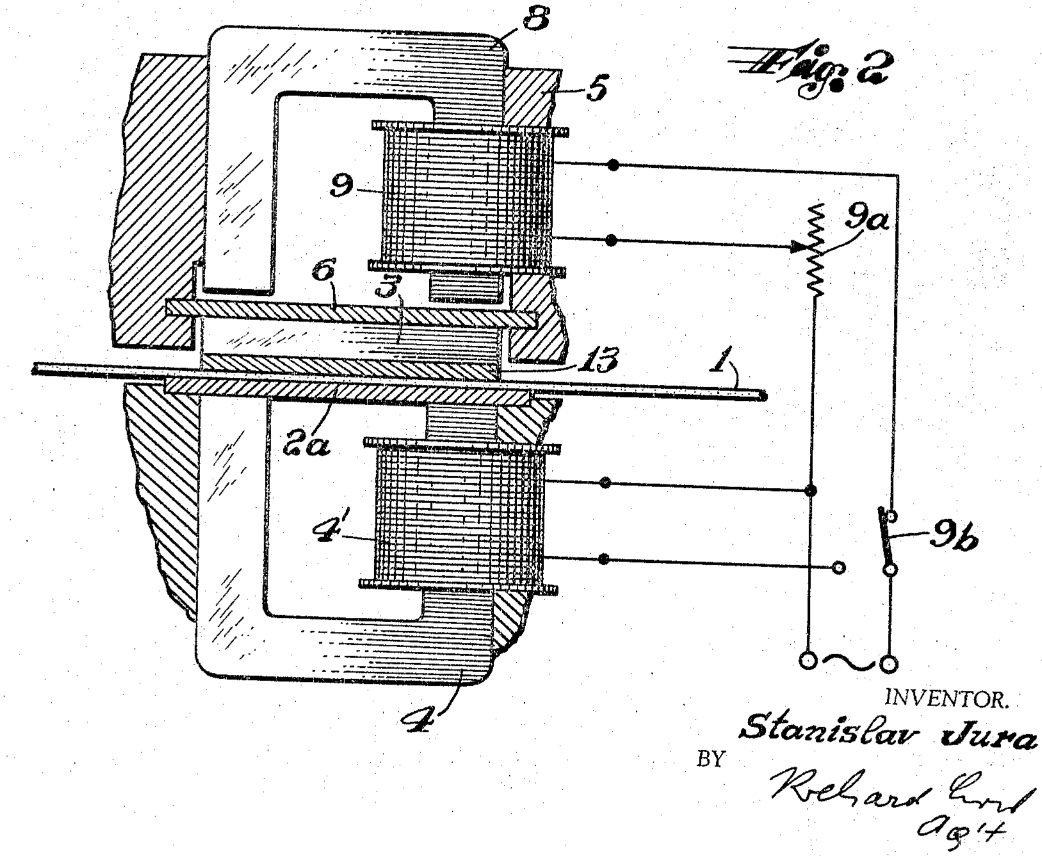
FIG. 2 shows a modified brake unit in a view similar to that of FIG. 1, and partly in diagram.

The modified brake unit shown in FIG. 2 uses an electromagnet having a U-shaped core 8 and a coil 9 instead of the permanent magnet 7 in an otherwise closely similar arrangement. The friction member 2a covers the pole faces of the core 4 and cooperates with a cermet facing 13 on the armature member 3. The metallic component of the facing 13 is iron. The adjustment mechanism for the abutment 6 has been omitted from the showing of FIG. 2 for the sake of clarity, and will be understood to be identical with that illustrated in FIG. 1.

A variable resistor 9a in the energizing circuit of the electromagnet coil 9 permits the force of the release magnet to be varied as needed. A single-pole, double-throw switch 9b interposed between the source of energizing current and the coils 4' and 9 permits the two magnets to be alternately energized, thereby to apply brake pressure when the coil 4' is energized, and to release the brake unit when the coil 9 is supplied with current in the illustrated position of the switch 9b. It will be understood that this switch is a conventional electronic switch requiring a few microseconds for switching from one position to the other.

It will be appreciated that the weight of the armature member 3 and of the ferrous cermet facing 13 is approximately balanced by the attractive force of the release magnet when the coil 9 is energized, and that the weight of the armature assembly contributes a portion of the braking force when the coil 9 is deenergized.

Figure 3:
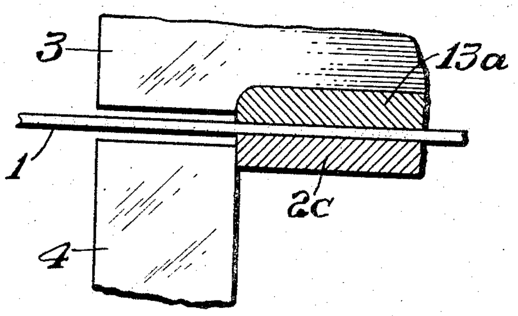
FIGS. 3 and 4 illustrate modified details in the brake units of FIG. 1 or 2.
Figure 4:
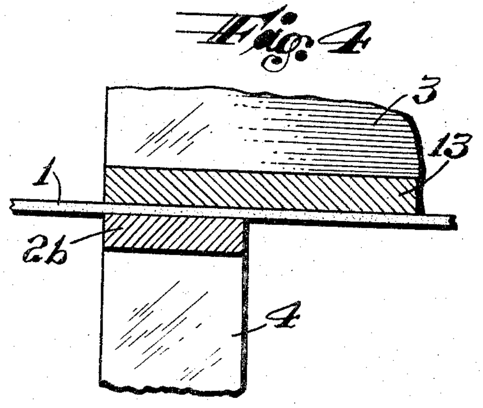

FIGS. 3 and 4 illustrate modifications of the armature member 3 and of the cooperating friction member. In FIG. 3, there is shown an armature member 3 whose contact face is partly recessed to receive a non-ferrous cermet facing 13a which partly projects beyond the ferrous metal surface of the armature member. A non-magnetic cermet body 2c closely similar to the friction member 2 shown in FIG. 2 provides the other brake face.

An armature member 3 provided with a ferrous cermet facing 13 as in FIG. 2 cooperates with brake facings 2b on the pole faces of the core 4 shown in FIG. 4. Such an arrangement is practical because of the magnetic nature of the ferrous cermet facings 2b employed. The gap in the magnetic circuit is reduced to a minimum. When the brake unit partly shown in FIG. 4 is applied to a ferromagnetic tape, the gap is practically zero, and the brake is applied in an extremely short time.

The brake unit shown in FIG. 5 differs from those discussed hereinabove in normally applying braking pressure to a tape 1 received in the gap between a friction member 2 and an armature member 3. The braking pressure is supplied by the weight of the armature member 3 and by a strong helical compression spring 9' interposed between the abutment member 6 and the bight portion of the release magnet core 8. The core is equipped with a coil 9, and the armature 3 is lifted from the tape 1 when the coil 9 is energized. The apparatus shown in FIG. 5 relies on elastic deformation of the relatively stiff abutment member 6, and the spring 9' and electromagnet 8, 9 must be selected accordingly.

The armature member 3 moves only over a minimal distance when the coil 9 receives current, the distance being only a small fraction, typically less than one quarter of the thickness of the tape 1, and limited by the positions and resilience of the bar 6 which are chosen accordingly. The importance of a short armature path for rapid release and application of the brake is evident.

Figure 5:
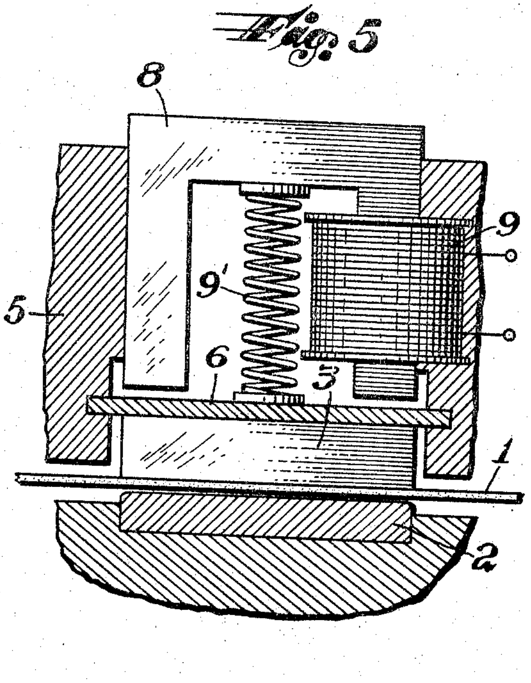
FIG. 5 illustrates yet another brake unit of the invention in elevational and partly sectional view.

The brake unit shown in FIG. 5 arrests tape movement in the event of failure in the current supply, and also prevents tape displacement in the critical area near the read-out unit if other portions of the tape are accidentally shifted.

Figure 6:
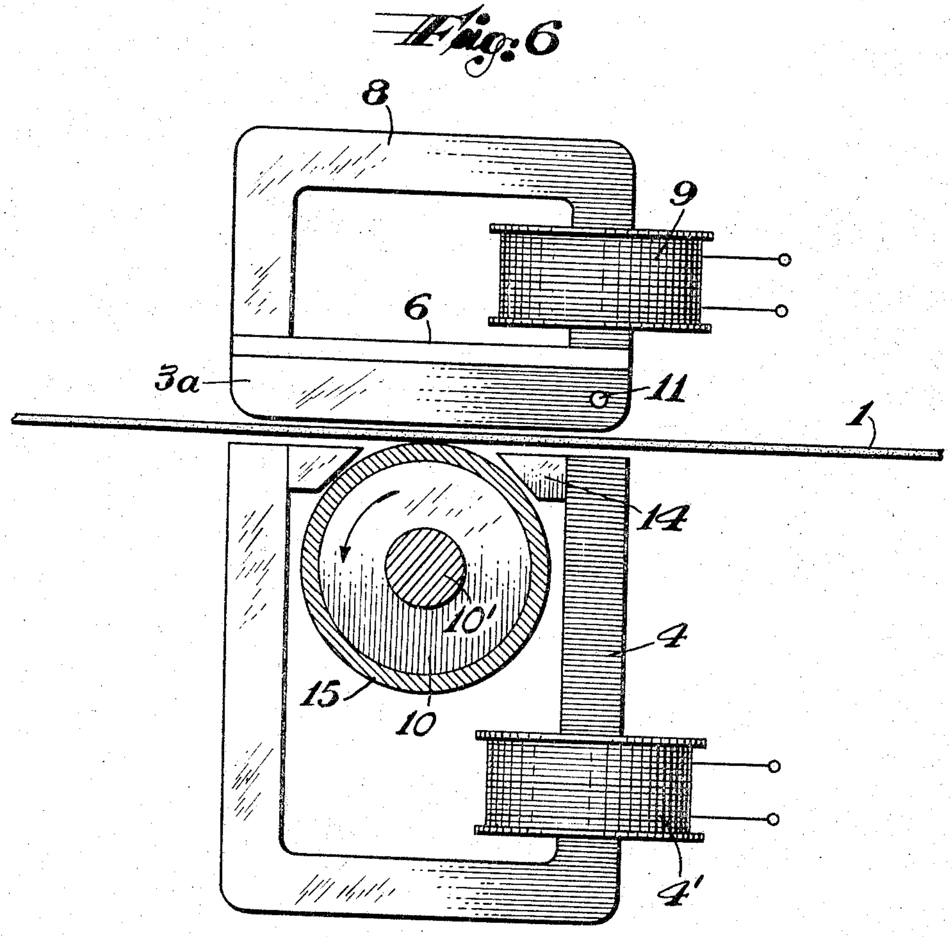
FIG. 6 shows a drive unit of the invention in elevation.

A drive unit of the invention which may be combined into a complete tape conveying mechanism with any one of the brake units of FIGS. 1–5 is shown in FIG. 6. The basic structure of the brake and drive units is closely similar. The fixedly mounted friction member which provides a brake face in the earlier described brake units is replaced in the drive units by a driven friction roll.

The unit illustrated in FIG. 6 has two magnet cores 4, 8 and the associated coils 4', 9 as shown in FIG. 2, the supporting frame structure having been omitted. A roll 10 is mounted between the legs of the core 4 on a shaft 10' which rotates at constant speed. Pole shoes 14 extend from the core 4 toward the face of the roll 10 which is covered with a friction facing 15 of cermet material.

The common armature of the two electromagnets 4, 4' and 8, 9 is an iron bar 3a which is mounted on one pole piece of the core 8 by a pin 11. The underside of the bar 3a is highly polished to minimize frictional effects on the tape 1. A nonferrous abutment bar 6 limits movement of the armature bar 3a substantially to the non-illustrated clearance of the pin 11 in the opening of the armature bar in which it is received.

The gap between the friction facing 15 and the armature bar 3a has been greatly exagerated in FIG. 6 for the sake of clarity. Actually, it is greater than the thickness of the tape 1 by less than the afore-described limits of movement of the bar 3a. Yet, the tape is not taken along by the drive roll, and the associated brake unit, not shown in FIG. 6, arrests tape movement as long as the coil 9 is energized while current to the coil 4' is cut off by a switch arrangement not shown in FIG. 6, but identical with that illustrated in FIG. 2. When the switch is shifted, the armature 3a presses the tape 1 against the friction facing 15 of the roll 10, and tape movement starts practically instantaneously at full speed.

Figures 7, 8, 9:
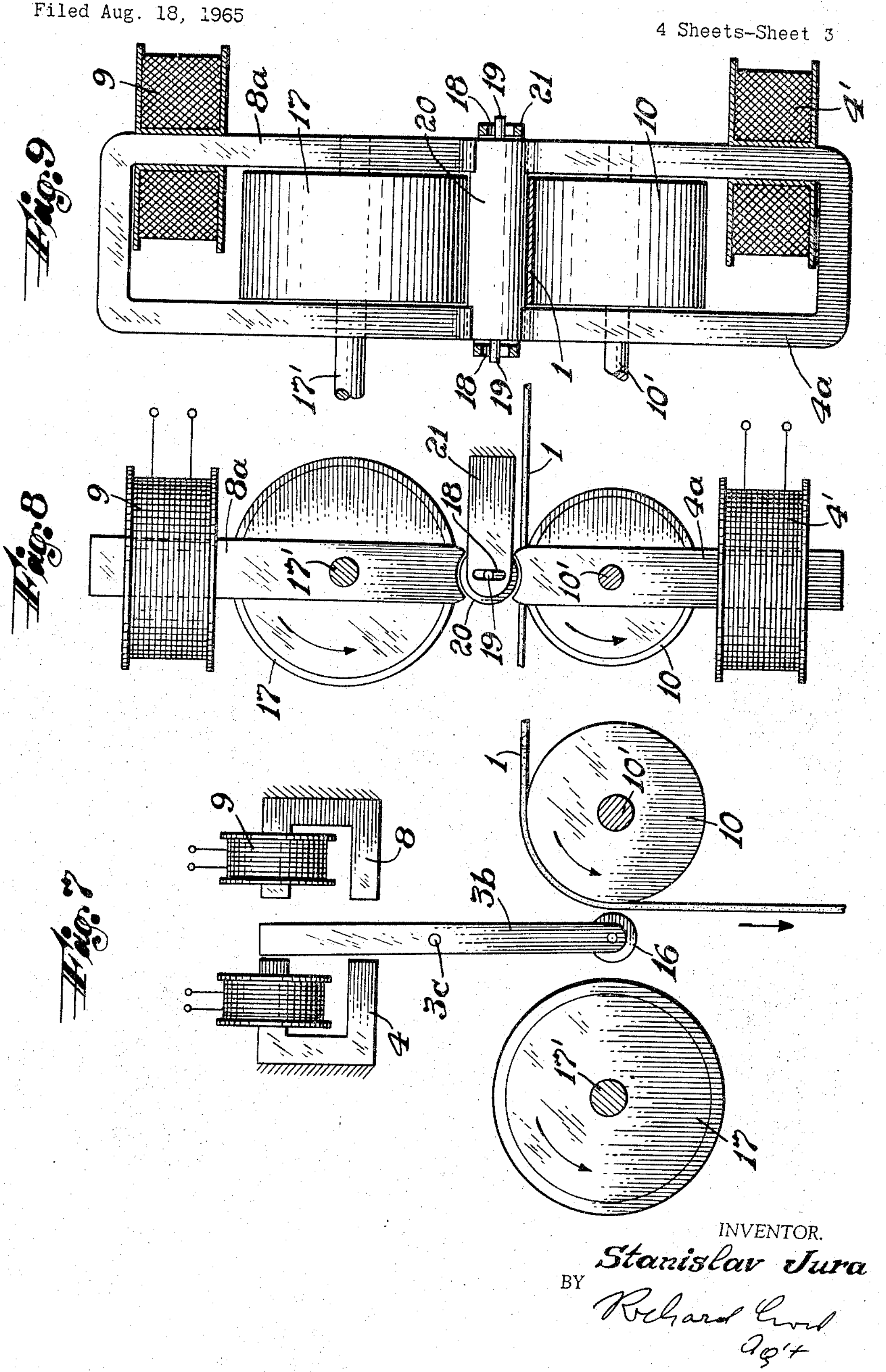
FIG. 7 shows another drive unit in front elevation.
FIGS. 8 and 9 show an additional drive unit in front and side elevation respectively.

In the modified drive unit shown in FIG. 7, the tape 1 is trained over the drive roll 10 in an arc of 90°. The armature assembly consists essentially of a lever 36 mounted on a stationary pivot pin 3c and carrying an idler roll 16 at the end of one of its arms. The other arm is arranged between the poles of the electromagnets 4 and 8 so as to move angularly back and forth when the magnets are alternatingly energized. While the lever pivots on the pin 3c, the idler roll 16 moves back and forth between the tape 1 on the continuously rotating roll and the surface of a second roll 17 whose shaft 17' is linked by a common drive to the shaft 10' so that the two shafts rotate synchronously. The diameter of the roll 17 is somewhat greater than that of the roll 10 so that the circumferential speed of the roll 17 is higher in the same ratio.

It will be understood that the gap between the rolls 10 and 17 and the corresponding gap between the electromagnets 4 and 8 have again been enlarged substantially for the purpose of clearer pictorial representation. Actually, the rolls 10 and 17 accommodate the idler roll 16 and the tape 1 therebetween with a clearance which is only a fraction of the tape thickness.

When the coil 9 of the release magnet is energized, the idler roll 16 is lifted from the tape 1 and pressed against the surface of the auxiliary roll 17 so that it is rotated at the higher surface speed of the latter. When the release magnet coil 9 is deenergized and the magnet core 4 attracts the lever 3*b*, the idler roll 16 is quickly shifted and its inertia provides the energy required for accelerating the tape 1 to the circumferential speed of the drive roll 10 against which it is pressed by the idler roll. The latter is simultaneously slowed to the lower circumferential speed of the drive roll 10. In this arrangement, the auxiliary driven roll 17 provides an abutment which limits the minute swinging movement of the armature assembly about the pin 3*c*.

A drive unit which also includes some of the features shown in FIG. 7 is illustrated in FIGS. 8 and 9, clearances again being enlarged in FIG. 8. U-shaped magnet cores 4*a*, 8*a* are arranged opposite each other and provided with coils 4', 9. Paired bearing openings in the legs of the cores 4*a*, 8*a* receive parallel drive shafts 10', 17' which are connected to a common drive motor (not illustrated) and are rotated thereby at the same constant speed. Rolls 10, 17 are fixedly fastened on the shafts 10', 17', the roll 17 being somewhat greater in diameter.

A bracket 21, which is an element of the stationary support frame, not otherwise shown, holds an idler roll 20 of magnetic material. Trunnions 19 at the two ends of the roll 20 are received in slots 18 on the bracket 21 with enough clearance to permit minimal movement of the roll 20 between the poles of the magnet cores 4*a*, 8*a*. The tape 1 passes with a small amount of clearance through the gap which opens between the drive roll 10 and the idler roll 20 when the coil 9 is energized. When current is shifted from the coil 9 to the coil 4', the idler roll 20 presses the tape 1 against the drive roll 10 for transportation thereby. The surface speed of the roll 17 is higher than the intended conveying speed of the tape 1, as described with reference to FIG. 7.

Figure 10:
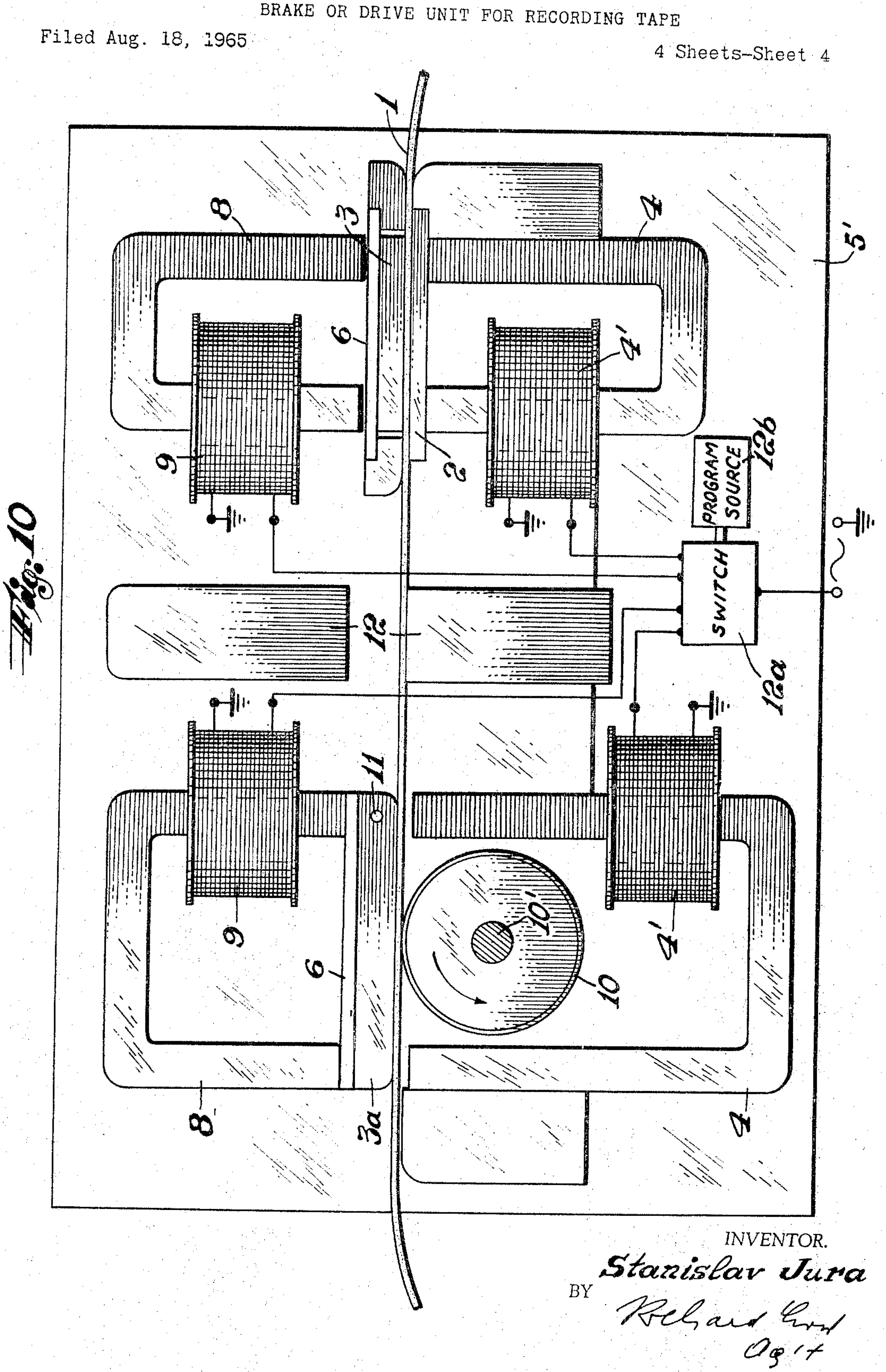
FIG. 10 illustrates a tape conveying mechanism of the invention which combines a brake unit substantially identical with that of FIG. 2 with the drive unit of FIG. 6.

The manner in which the several brake units and drive units are combined in a tape conveying arrangement is illustrated in FIG. 10. The brake unit illustrated is practically identical with that shown in FIG. 2, the drive unit with that illustrated in FIG. 6. The tape 1 passes first through the brake unit, then through a readout unit 12 and ultimately through the drive unit. The readout unit, not itself relevant to this invention and not shown in detail, may consist of a light source on one side of the tape path and of a photoelectric cell on the other side as is conventional if the tape carries information in the form of punched holes.

A switch unit 12*a* is connected to the two release magnet coils 9 and the two pressure magnet coils 4'. The unit mainly consists of an electronic single-pole double-throw switch actuated by a suitable program source 12*b*. In one position of the switch unit 12*a*, the release magnet coil 9 of the brake unit and the pressure magnet coil 4' of the drive unit are energized. In the other switch position, the brake unit arrests the tape 1 while the drive unit is released. The rotary speed of the shaft 10' is suitably synchronized with the program source 12*b*, to ensure sequential presentation of the indicia on the tape 1 to the readout unit 12, or selective presentation of specific indicia.

The program source, not itself relevant to this invention, may be any portion of the computer which produces a suitable switch control signal in timed correlation with other functions of the computer.

While the invention has been described with particular reference to perforated or punched tape, it is not limited thereto, nor to any specific information carrier. Obviously many modifications and variations of the present invention are possible in the light of the above teachings. It is therefore to be understood that, within the scope of the appended claims, the invention may be practiced otherwise than as specifically described.

What is claimed is:

1. In a tape conveying mechanism, in combination:

(a) a friction member having an exposed friction face;

(b) armature means including an armature member having an exposed face opposite said friction face and defining a gap therewith, said armature means being at least partly of magnetic material;

(c) magnetic release means for moving said face of the armature member in a direction away from said friction face;

(d) guide means for guiding a tape of predetermined thickness through said gap; and (e) abutment means for limiting the movement of said face of the armature member in said direction to a distance not substantially greater than said thickness.

2. In a mechanism as set forth in claim 1, said distance being smaller than said thickness.

3. In a mechanism as set forth in claim 1, said magnetic release means including an electromagnet, a source of current for energizing said electromagnet, and control means for varying the intensity of the energizing current.

4. In a mechanism as set forth in claim 1, a support, said friction member being mounted on said support, and fastening means for fastening said abutment means on said support in a plurality of positions at different respective distances from said face in said direction.

5. In a mechanism as set forth in claim 1, a support, said friction member being mounted on said support, and fastening means for fastening said magnetic release means on said support in a plurality of positions at different respective distances from said friction face in said direction.

6. In a mechanism as set forth in claim 1, said abutment means including an abutment member of non-magnetic material.

7. In a mechanism as set forth in claim 6, said abutment member being resilient.

8. In a mechanism as set forth in claim 1, magnetic pressure means for moving said face of the armature member toward said friction face.

9. In a mechanism as set forth in claim 8, a tape of said thickness guided by said guide means and passing through said gap, said tape being of ferromagnetic material.

10. In a mechanism as set forth in claim 8, said magnetic pressure means having a magnetic core and constituting a magnetic circuit with the magnetic material of said armature means for passage of magnetic flux therethrough, the cross sectional area $Q_A$ of said magnetic material of the armature means transversely of the direction of flux passage substantially satisfying the equation $$Q_A = \frac{p_K \cdot L_A \cdot Q_K}{2p_A \cdot p_K \cdot x + p_A \cdot L_K}$$

wherein $p_K$ is the relative permeability of said core, $p_A$ is the relative permeability of said magnetic material, $L_K$ is the median length of the lines of force of said circuit in said core, $L_A$ is the median length of the lines of force of said circuit in said magnetic material, $Q_K$ is the cross sectional area of said magnetic core transverse to said passage of flux, and $x$ is said thickness.

11. In a mechanism as set forth in claim 8, a tape of said thickness guided by said guide means and passing through said gap, said tape being of ferromagnetic material, said magnetic pressure means having a magnetic core and constituting a magnetic circuit with said magnetic material of the armature means for passage of magnetic fluid therethrough, the cross sectional area $Q_A'$ of said magnetic material of said armature member transversely of the direction of flux passage substantially satisfying the equation $$Q_A' = \frac{p_K \cdot L_A \cdot Q_K}{p_A \cdot L_K}$$

wherein $p_K$ and $p_A$ are the relative permeabilities of said magnetic core and of said magnetic material respectively, $L_K$ and $L_A$ are the median lengths of the lines of force of said circuit in said core and in said magnetic material respectively, and $Q_K$ is the cross sectional area of said magnetic core transverse of said passage of flux.

12. In a mechanism as set forth in claim 8, a friction facing on at least one of said faces.

13. In a mechanism as set forth in claim 12, said friction facing being of cermet material.

14. In a mechanism as set forth in claim 12, said friction facing projecting beyond said one face toward the other one of said faces.

15. In a mechanism as set forth in claim 8, said abutment means including an abutment member, said friction member, said armature member and said abutment member being rotatable about respective axes.

16. In a mechanism as set forth in claim 15, drive means for simultaneously rotating said abutment member and said friction member at different respective circumferential speeds.

17. In a tape conveying arrangement, in combination:

(a) a drive unit including
  (1) a drive roll having an exposed face;
  (2) first armature means including a first armature member having an exposed face opposite said face of the drive roll and defining a first gap therewith, said armature means being at least partly of magnetic material;
  (3) first magnetic release means for moving said face of the armature member in a first direction away from said face of the driven roll; and
  (4) first abutment means for limiting the movement of said face of the armature means in said direction;

(b) a brake unit including
  (1) a brake member having a brake face;
  (2) second armature means including a second amature member having an exposed face opposite said brake face and defining a second gap therewith, said second armature means being at least partly of magnetic material;
  (3) second magnetic release means for moving said face of the second armature member in a second direction away from said brake face; and
  (4) second abutment means for limiting the movement of the face of said second armature member in said second direction; and (c) an elongated tape member having two longitudinal portions respectively received in said gaps.

18. In an arrangement as set forth in claim 17, a source of electric current; and switch means operatively connecting said first and second magnetic release means to said source for energizing said release means in timed sequence.

19. In an arrangement as set forth in claim 18, first and second magnetic pressure means for respectively moving said faces of the armature members of said first and second armature means toward said exposed face of the driven roll and toward said brake face, said pressure means being operatively connected to said source by said switch means for energizing of said pressure means in timed sequence with the energizing of said release means.

20. In a mechanism of the type described, in combination:

(a) a friction member having an exposed friction face;
(b) an armature member having an exposed face opposite said friction face,
  (1) said faces defining a gap therebetween;
(c) an elongated tape in said gap;
(d) means for moving said tape longitudinally through said gap;
(e) first armature moving means for moving said armature member away from said friction member in a direction transverse of said faces;
(f) second armature moving means for moving said armature member toward said friction member in said direction,
  (3) one of said armature moving means including an electromagnet and means for energizing said electromagnet;
(g) abutment means for arresting movement of said armature member by said first armature moving means when the width of said gap between said faces exceeds the thickness of said tape by not more than one quarter of said thickness.

21. In a mechanism as set forth in claim 20, wherein the width of said gap exceeds the thickness of said tape by not substantially more than 0.02 millimeter when movement of said armature member is arrested by said abutment means.

References Cited

UNITED STATES PATENTS

| | | | |
|---|---|---|---|
| 3,184,129 | 5/1965 | Knecht | 255—106 |
| 3,197,105 | 7/1965 | Peters | 226—176 |
| 3,227,344 | 1/1966 | Rutter | 226—145 |

FOREIGN PATENTS

| | | |
|---|---|---|
| 242,874 | 2/1963 | Australia. |
| 923,026 | 4/1963 | Great Britain. |
| 948,650 | 2/1964 | Great Britain. |

ALLEN N. KNOWLES, *Primary Examiner.*